Oct. 4, 1966

V. C. REES 3,276,931

APPARATUS AND PROCESS FOR COMBINING GLASS
FIBERS WITH SYNTHETIC RESIN FIBERS

Original Filed Dec. 27, 1956

INVENTOR.
Vernon C. Rees
BY
John A. McKinney
ATTORNEYS

United States Patent Office 3,276,931
Patented Oct. 4, 1966

3,276,931
APPARATUS AND PROCESS FOR COMBINING GLASS FIBERS WITH SYNTHETIC RESIN FIBERS
Vernon C. Rees, Newark, Ohio, assignor to Johns-Manville Corporation, New York, N.Y., a corporation of New York
Original application Dec. 27, 1956, Ser. No. 630,905, now Patent No. 3,091,018, dated May 28, 1963. Divided and this application Dec. 19, 1961, Ser. No. 160,548
20 Claims. (Cl. 156—167)

This invention relates to a process for combining glass fibers with synthetic resin fibers, and more particularly relates to the combination of continuous glass fibers with continuous synthetic resin fibers and to the strand produced thereby. This is a division application of copending application Serial No. 630,905, filed December 27, 1956, now Patent No. 3,091,018.

Glass in strand form is an excellent insulating medium for electrical conductors such as copper wire or the like, when wrapped upon such conductor. However, glass is brittle and breaks even in flexible fiber form when subjected to extreme bending stresses. Therefore, when applied to electrical conductors which are bent sharply as during fabrication into electrical coils, the fibers of the strands break causing a fuzzing of the insulator with the result that the insulation may actually be broken away from the conductor in spots.

Accordingly, it is an important object of this invention to provide continuous strands containing continuous glass fibers and continuous synthetic resin fibers bound together by a sizing agent.

It is another important object to provide a process for the production of continuous strands containing continuous glass fibers and continuous synthetic resin fibers bound together by a sizing agent.

It is another object to provide a process for combining continuous synthetic resin fibers in strand form with a plurality of continuous glass fibers at the point where the glass fibers are gathered into a strand.

Other objects and advantages of the invention will become more apparent during the course of the following description when taken in connection with the accompanying drawings.

In the drawings wherein like numerals are employed to designate like parts throughout the same:

Figure 1:
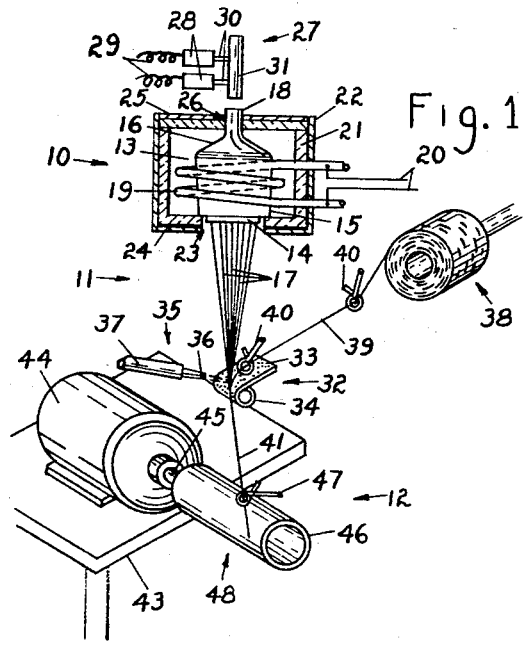
FIG. 1 is a perspective view, partially in section, of apparatus provided by the present invention for producing continuous strands containing continuous glass fibers and continuous synthetic resin fibers.

As shown in FIG. 1 the apparatus for forming a continuous strand of glass and synthetic resin fibers comprises a glass melting section 10, a fiber attenuation and strand forming section 11, and a strand winding section 12. The glass melting section 10 includes a glass melting pot 13 of circular cross-section and preferably formed of platinum to resist the action of molten glasses. The pot 13 includes a circular base 14, a generally cylindrical side wall 15 and an inverted funnel-shaped top 16. The base 14 is provided with a plurality of small apertures preferably arranged in concentric circular array and the molten glass is exuded through these apertures as small streams to be attenuated into continuous fibers 17. The top 16 of the pot 13 terminates in a vertically extending inlet tube 18 through which glass forming materials are adapted to be introduced for melting within the pot.

The melting pot 13 is encircled by an induction heating coil 19 which is adapted to be actuated by electric current from lines 20 for heating the pot. The heating coil 19 is embedded in a refractory insulating material 21 enclosed within a casing 22. The casing 22 is provided with an opening 23 in its base 24 and the melting pot 13 is positioned over said opening. Clearance is provided between the apertures in the base 14 of the melting pot 13 and the opening 23 in the base 24 of the casing 22 whereby glass streams which are exuded from the pot may pass freely downwardly. The top 25 of the casing 22 is also provided with an aperture 26 through which the inlet tube 18 of the pot 13 protrudes.

As mentioned previously, the inlet tube 18 of the pot 13 is adapted to receive glass forming materials, suitably in the form of glass marbles. The marbles are conveyed to the melting pot 13 from a bulk source and are metered thereinto by a metering device 27. The metering device 27 includes a pair of solenoids 28 which are fed with an electric current through lines 29. Each of the solenoids 28 is provided with a solenoid rod 30, adapted to be inserted into and withdrawn from a marble conduit 31. Thus upon alternate activation of the solenoids 28, marbles are metered individually into the melting pot 13.

The fiber attenuation and strand forming section 11 includes a strand forming guide 32 suitably comprised of a felt pad 33 secured over a shaped guide member 34. The guide 32 is positioned in vertically spaced relation between the bottom of the pot 13 of the glass melting section and the strand winding section. A size applicator 35 in the form of a nozzle 36 secured to the end of a conduit 37 is positioned to direct a small stream of liquid size onto the felt pad 33 for lubricating the glass fibers 17 to reduce mutual abrasion, as well as abrasion between the fibers and the pad.

A package 38 of synthetic resin fibers in continuous strand form 39 is positioned upon a suitable support in approximate horizontal alignment with the strand forming guide 32. Two guide eyes 40 are positioned in suitable supports in alignment between the package 38 of synthetic resin strand 39 and the strand forming guide 32. Strand 39 from the package 38 is threaded through such guide eyes, directed into the cone formed by and surrounded by the glass fibers as they converge into a strand 41 at the strand forming guide 32, where both strand 39 and fibers 17 are bonded together by the sizing liquid.

The strand winding section 12 includes a suitable support such as a table 43, having a motor 44 mounted thereon. The motor 44 is provided with a rotatable shaft 45 upon which a tube 46 is adapted to be mounted for rotation at a high peripheral speed on the order of 8000 to 20,000 lineal feet per minute. A traverser 47 directs the strand 41 back and forth across the tube 46 which is thereby wound on the tube to form a package 48.

Figure 2:
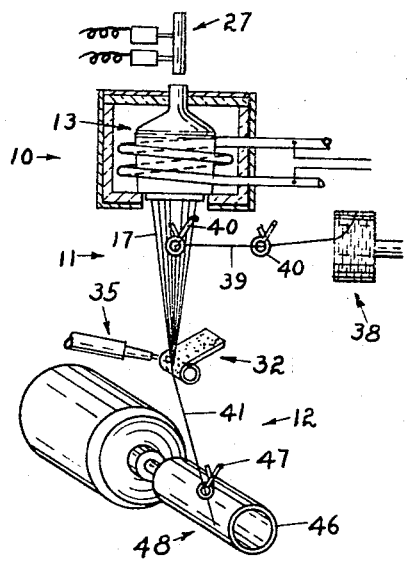
FIG. 2 is another embodiment of the apparatus shown in FIG. 1.

FIG. 2 shows another embodiment of the apparatus of FIG. 1. In this embodiment the glass melting section, the fiber attenuation and strand forming section, as well as the strand winding section are substantially the same as the corresponding units shown and described in the embodiment of FIG. 1. However, the synthetic resin strand 39 is introduced into the glass fibers 17 at a point higher up than the strand gathering guide. That is, the synthetic resin strand is introduced into the center of the cone of glass fibers and combines with the glass fibers at their point of convergence into a strand at the strand gathering guide. It will thus be seen that the actual combination takes place at the same point as that of FIG. 1, namely at the guide. However, in the embodiment of FIG. 2, there is a tendency for the synthetic resin strand to be more nearly positioned in the exact center of the final strand and serve as a core for the surrounding glass fibers as they are aligned substantially parallel therewith.

For certain applications of the finished product, this may be more desirable than the strand produced by the combination described in FIG. 1 where it is possible that the synthetic resin strand may be placed somewhat off center of the strand.

As shown in FIG. 2 the guide eyes 40 are aligned in a horizontal plane spaced intermediate the bottom of the melting pot 13 and the strand gathering guide 32. The package 38 of synthetic resin strand 39 is positioned in axial alignment with the eyes 40 so that the strand feeds freely from the end of the package 38 into and through the eyes.

Figure 3:
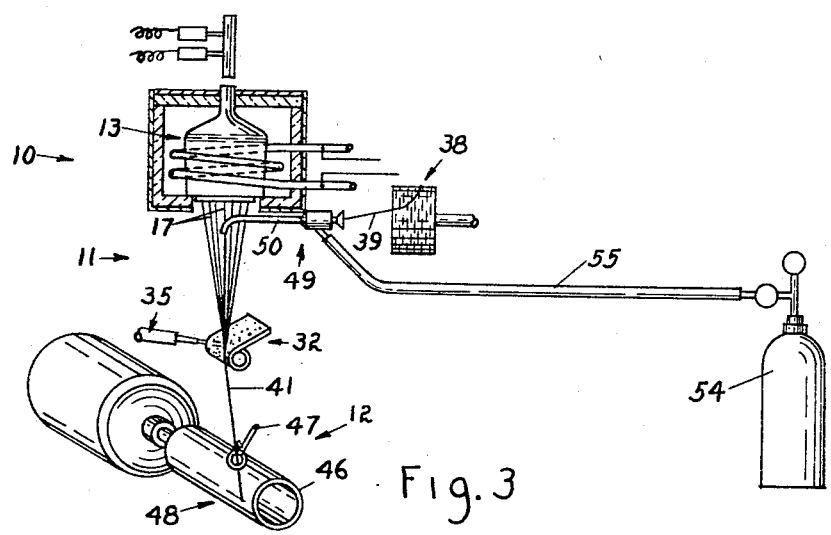
FIG. 3 is a view similar to FIG. 2 showing a different type of synthetic resin strand feeding device.
Figure 4:
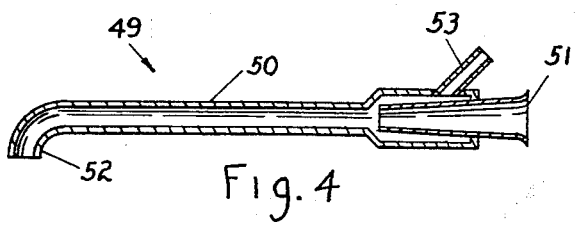
FIG. 4 is a longitudinal sectional view of the synthetic resin strand feeding device of FIG. 3.

FIG. 3 shows an embodiment of the invention as described in FIG. 2 which includes a different type of synthetic resin strand feeding device. The glass melting section and strand winding section of this embodiment as well as the fiber attenuation and strand forming section are substantially the same as the corresponding units shown and described for the embodiments of FIGS. 1 and 2. However, the synthetic resin strand feeder 49, as shown in the section view of FIG. 4 is of the gas-assist venturi-type and comprises an elongated tubular strand conduit 50, provided with a flare 51 at the entrance end and with a 90° bend 52 at the exit end. A gas assist conduit 53 is joined to the strand conduit 50 and is adapted to direct a stream of gas monodirectionally through the strand conduit for assisting the strand during the startup of the operation.

As shown in FIG. 3 the strand feeder 49 is positioned in a horizontal plane between the bottom of the melting pot 13 and the strand gathering guide 32 with the 90° bend 52 directed downwardly toward the gathering guide. A compressed gas source such as a tank 54 of compressed air is connected by means of a conduit 55 to the gas assist conduit 53 of the strand feeder 49. A package 38 of synthetic resin strand 39 is positioned in axial alignment with the tubular strand conduit 50 so that the strand 39 can feed from the end of the package into and through the feeder.

The operation of the apparatus of each of FIGS. 1, 2 and 3 is essentially the same. To start the process, glass melting materials are introduced into the melting pot 13 by the glass feeding device 27 and the pot is heated to glass melting temperature by energizing the induction coil 19. When the glass is reduced to molten state it begins to exude as small streams through the apertures in the bottom 14 of the melting point 13. At this point the size is turned on to saturate the pad 33. The glass streams bead downwardly and form fibers which can be gathered into a strand 41 by hand and placed over the gathering guide and then pulled downwardly to the spool 46 and wrapped thereon for starting. The winding motor 44 is then turned on and the winding operation is commenced. Then the strand 39 from the package 38 of synthetic resin strand is threaded either through the eyes 40 of FIGS. 1 and 2 or by means of the gas assist through the tubular guide 50 of FIG. 3. Inasmuch as the glass fibers have been brought up to proper attenuation speed, they will automatically grasp the end of the synthetic resin strand 39 which will then be continuously drawn with the glass fibers 17 into a composite strand 41 containing both glass fibers and synthetic resin fibers. The winding operation is continued with the traversing device 47 moving the composite strand 41 back and forth along the surface of the tube 46 until a package 48 of desired weight is produced. Then the winding operation is stopped while the package 48 is removed and replaced with an empty tube 46. The operation is then repeated in the manner described above.

Thus as shown in the above embodiments of the invention, an apparatus and process are provided for the production of a continuous strand comprised of glass fibers and synthetic resin fibers bonded together by a sizing material.

Glass forming materials which can be used in the present invention include those adapted to fiber formation. One suitable composition is known as "E" glass and has the following composition:

| Ingredient: | By percent weight |
| --- | --- |
| $SiO_2$ | 53.78 |
| $B_2O_3$ | 10.31 |
| $R_2O_3$ ($Al_2O_3$, $TiO_2$, $Fe_2O_3$) | 14.50 |
| $Na_2O$ | 0.43 |
| $K_2O$ | 0.05 |
| $CaO$ | 15.68 |
| $MgO$ | 4.88 |
| $BaO$ | 0.37 |

Substantially any type of fiber in multifilament yarn form is adapted for use in the product and process of the present invention. However, the multifilament yarns made of thermoplastic resins are preferred. Synthetic materials adapted to the production of this invention include both regenerated cellulose rayon and rayon prepared from cellulose derivatives. Also natural proteins including the natural linear polyamides made from casein and soybeans can be used. The synthetic linear polyamides known as the nylons are also applicable. These are suitably obtained by the polymerization of diamines with dibasic acids or their amide forming derivatives, or of amino-acids, or of a mixture of bifunctional compounds containing complementary amide-forming groups such that appreciable numbers of amide linkages are produced in the molecular chain of the polymer formed. There are numerous types of nylons obtainable, the natures of which depend on the types of reactants chosen, the proportion of the reactants, and extent of polymerization. Nylon is a generic term for any long-chain synthetic polymeric amide which has recurring amide groups as an integral part of the main polymer chain, and which is capable of being formed into a filament in which the structural elements are oriented in the direction of the axis. Also the vinyl resins are applicable including polyvinyl acetate, polyvinyl alcohol, polyvinyl acetals, polymers of the acetal derivatives, polyvinyl chloride, polymerized vinylidene chloride and the copolymer of vinyl chloride and vinyl acetate. Further, the vinyl chloride-acrylonitrile polymers, polyethylene and the polyurethanes can be employed. The polyurethanes include condensation products of diisothiocyanates, or diisothiocyanates and a bifunctional dichlorophenol or dithiol and condensation products of a diisocyanate and a diamide. One particular fiber which we have preferred to use is a multifilament strand made of Dacron (trademark) which is a polyester fiber made from methyl terephthalate and ethylene chloride. Also Orlon strands (trademark) are adapted to use. Orlon is a polyacrylonitrile resin.

It is also to be included within the scope of the invention to combine natural fibers with glass fibers and examples of such natural fibers include silk strand, cotton thread, wool thread, with the qualification that such threads be of small diameter and be coated so that they are substantially fuzz free and thereby adapted for high feed rates.

As pointed out above, one of the principal advantages of the present invention comprises the production of an electrical insulator strand having the properties of both glass and a synthetic resin. Accordingly, when a thermoplastic synthetic resin strand is combined with glass in the manner of the invention, a unique insulation material is provided. This strand may be subjected to heat to cause the synthetic resin to flow through the glass fibers and in effect coat them with a thin layer of the thermoplastic resin. Thus a strand is provided wherein the glass fibers are insulated from each other to reduce abrasion between them and which is extremely resistant against breakage of fibers when the strand is subjected to a sharp bend.

Another advantage is that even without the fusion step above described, a coherent strand bearing both glass and a synthetic resin is provided. Since the strand is coherent by being bound together by the sizing material, it can be applied as by spiral winding upon an electrical wire for insulating the same. Then the fabricated unit can be subjected to elevated temperatures to melt the thermoplastic resin and cause it to flow in admixture with and bond the glass fibers together. The effect is that the electrically wrapped insulator becomes coated with a uniform layer of glass in admixture with a thermoplastic synthetic resin. As mentioned, this has the advantage that the conductor can be bent without breakage of the glass fibers and without fraying such fibers at the point of strain.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. Apparatus for the production of a continuous strand, comprised of glass fibers, organic fibers and a bonding agent, comprising a vessel for producing a body of molten glass, said vessel having a plurality of apertures in a wall thereof through which small streams of molten glass are adapted to be exuded, means for attenuating each of said molten streams to a fiber, a guide for gathering said fibers into a strand, means for applying a bonding agent to said fibers, and an organic fiber strand feeder positioned adjacent said guide and adapted to direct a continuous organic fiber strand into said glass strand at its point of formation at the guide.

2. Apparatus for producing a bonded strand comprising, a melting chamber containing a body of molten glass said melting chamber having a plurality of apertures in a wall thereof through which molten streams of glass are adapted to be exuded, means for attenuating said molten streams into continuous fibers, a guide for gathering said continuous fibers into a strand, means for applying a sizing material to said continuous fibers, and an organic fiber strand feeder positioned between said melting chamber and said guide to direct an organic fiber strand among said glass fibers in a direction toward said guide.

3. Apparatus for producing a bonded strand comprising, means for producing a plurality of spaced continuous glass fibers, a guide for converging said continuous fibers into a strand, means for applying a bonding agent to said continuous fibers at said guide, and an organic fiber strand feeder positioned to direct an organic fiber strand among said continuous fibers.

4. Apparatus for producing a bonded strand as defined in claim 3, wherein the strand feeder comprises a guide eye positioned adjacent said guide.

5. Apparatus for producing a bonded strand as defined in claim 3, wherein the strand feeder comprises a tubular element positioned adjacent said guide.

6. The process of producing a bonded strand, comprising a coherent strand of organic fibers at least partially surrounded by continuous glass fibers, comprising providing a plurality of spaced and aligned continuous glass fibers, converging said glass fibers to a point of strand formation, directing a coherent strand of organic fibers to the point of strand formation in alignment with the converging glass fibers, and applying a bonding agent to all of the fibers at the point of strand formation to thereby form a bonded strand.

7. A process as defined in claim 6 wherein the organic fibers are made of a synthetic resin.

8. A process as defined in claim 6 wherein the organic fibers are made of a thermoplastic synthetic resin.

9. A process as defined in claim 6 wherein the organic fibers are made of a long chain synthetic polymeric amide which has recurring amide groups as an integral part of the main polymer chain.

10. A process as defined in claim 6 wherein the organic fibers are made of a polyester resin made by the polymerization of methyl terephthalate and ethylene chloride.

11. A process as defined in claim 6 wherein the organic fibers are natural fibers.

12. A process as defined in claim 6 wherein the organic fibers are selected from the group of cotton, silk and wool.

13. The process of producing a bonded strand composed of a plurality of continuous glass fibers, a plurality of organic fibers and a bonding material wherein the organic fibers are present as a coherent strand forming a core and the continuous glass fibers are present as a tubular sheath surrounding said core, and wherein all of the fibers are bonded in intimate contacting relationship by said bonding material, comprising providing a plurality of aligned and circularly spaced continuous glass fibers, converging said glass fibers in cone-like array to a point of strand formation, introducing a coherent strand of organic fibers centrally into said cone-like array and coaxial thereto, and applying a bonding agent to all of the fibers at the point of strand formation to thereby form a bonded strand.

14. A process as defined in claim 13 wherein the organic fibers are formed from a synthetic resin.

15. A process as defined in claim 13 wherein the organic fibers are formed of a thermoplastic synthetic resin.

16. A process as defined in claim 13 wherein the organic fibers are fabricated from a long chain synthetic polymeric amide which has recurring amide groups as an integral part of the main polymer chain.

17. A process as defined in claim 13 wherein the organic fibers are fabricated from a polyester resin made by the polymerization of methyl terephthalate and ethylene chloride.

18. A process as defined in claim 13 wherein the organic fibers are naturally occurring fibers.

19. A process as defined in claim 13 wherein the organic fibers are selected from the group of cotton, silk and wool.

20. The process of producing a bonded strand composed of a plurality of continuous glass fibers, a plurality of organic fibers and a bonding material wherein the organic fibers are present as a coherent strand forming a core and the continuous glass fibers are present as a tubular sheathing surrounding said core and wherein all of the fibers are bonded in intimate contacting relationship by said bonding material comprising: exuding a plurality of small streams of molten glass through the apertures of a glass melting vessel; attenuating each of said molten streams to a fiber; converging the glass fibers in cone-like array to a point of strand formation; introducing a coherent strand of organic fibers centrally into said cone-like array and coaxial thereto; and applying a bonding agent to all of the fibers at the point of strand formation to thereby form a bonded strand.

References Cited by the Examiner

UNITED STATES PATENTS

| | | | |
|---|---|---|---|
| 2,230,271 | 2/1941 | Simpson | 156—167 X |
| 2,252,999 | 8/1941 | Wallach | 57—140 |
| 2,750,317 | 6/1956 | Manning | 156—167 |
| 2,759,520 | 8/1956 | Lawrence | 156—441 |
| 2,852,425 | 9/1958 | Shobert | 156—180 |
| 2,941,915 | 6/1960 | Manning | 156—167 |
| 3,026,226 | 3/1962 | Toney et al. | 156—180 |
| 3,034,566 | 5/1962 | McKay | 156—441 |

EARL M. BERGERT, *Primary Examiner.*

RUSSELL C. MADER, *Examiner.*

H. G. GARNER, P. DIER, *Assistant Examiners.*